US007016314B2

(12) United States Patent
Dianda et al.

(10) Patent No.: US 7,016,314 B2
(45) Date of Patent: Mar. 21, 2006

(54) METHOD AND APPARATUS FOR TRANSFERRING ATM SERVICES

(75) Inventors: Robert Brian Dianda, Naperville, IL (US); Hsien-Chuen Yu, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 895 days.

(21) Appl. No.: 09/825,623

(22) Filed: Apr. 3, 2001

(65) Prior Publication Data

US 2004/0213250 A1 Oct. 28, 2004

(51) Int. Cl.
*H04L 12/16* (2006.01)

(52) U.S. Cl. .................. 370/259; 370/395.1; 370/401; 370/522; 379/212.01

(58) Field of Classification Search ............... 370/259, 370/395.1–395, 401, 410, 52, 397, 522; 379/211.02, 379/212.01, 201.01, 212.02
See application file for complete search history.

(56) References Cited

U.S. PATENT DOCUMENTS

| | | | | |
|---|---|---|---|---|
| 5,095,504 A | * | 3/1992 | Nishikawa et al. | ......... 379/162 |
| 5,617,471 A | * | 4/1997 | Rogers et al. | ......... 379/212.01 |
| 6,389,022 B1 | * | 5/2002 | Jeong et al. | ............. 370/395.2 |
| 6,765,903 B1 | * | 7/2004 | Allen, Jr. et al. | ........... 370/356 |
| 6,799,210 B1 | * | 9/2004 | Gentry et al. | ................ 709/223 |
| 6,925,082 B1 | * | 8/2005 | Buhrke et al. | .............. 370/393 |

OTHER PUBLICATIONS

International Telecommunication Union, Q.952.7 Series Q: Switching and Signalling Digital Subscriber Signalling System No. 1—Stage 3 Description for Supplemental Services using DSS 1, Jun. 1997.

* cited by examiner

*Primary Examiner*—Ricky Ngo
*Assistant Examiner*—Nittaya Juntima (57) ABSTRACT

A method and apparatus are provided for transferring an ATM call. A first ATM call (124) is established between a first party (120) and a second party (116) and a second ATM call (128) is established between the second party (116) and a third party (118). The first and second ATM calls both include a plurality of segments (124a–d, 128a–d) or connections that are coupled to a plurality of ATM switches (208, 210, 212, 214) over ATM facilities to provide virtual connections. The transfer is accomplished by sending a message to the ATM switch over the ATM facility (109) to request the transfer of the first party to the third party. The message identifies the first ATM call and the second ATM call. The switch makes a new connection (220) between the first ATM call and the second ATM call and releases the segments of the first and second ATM calls that connect the ATM switch to the second party. As a result, the first party and the third party are connected for communication.

8 Claims, 5 Drawing Sheets

METHOD AND APPARATUS FOR TRANSFERRING ATM SERVICES

FIELD OF THE INVENTION

The invention generally relates to telecommunications, and in particular, to the transfer of a switch virtual channel over an ATM facility.

BACKGROUND OF THE INVENTION

ATM (Asynchronous Transfer Mode) switches are being employed as the switch fabric in telecommunications switches. In particular ATM switches are being used for inter-switch connections and to interconnect access gateways, e.g., line access gateways and trunk access gateways. These ATM services are being used for data and voice connections.

Figure 1:
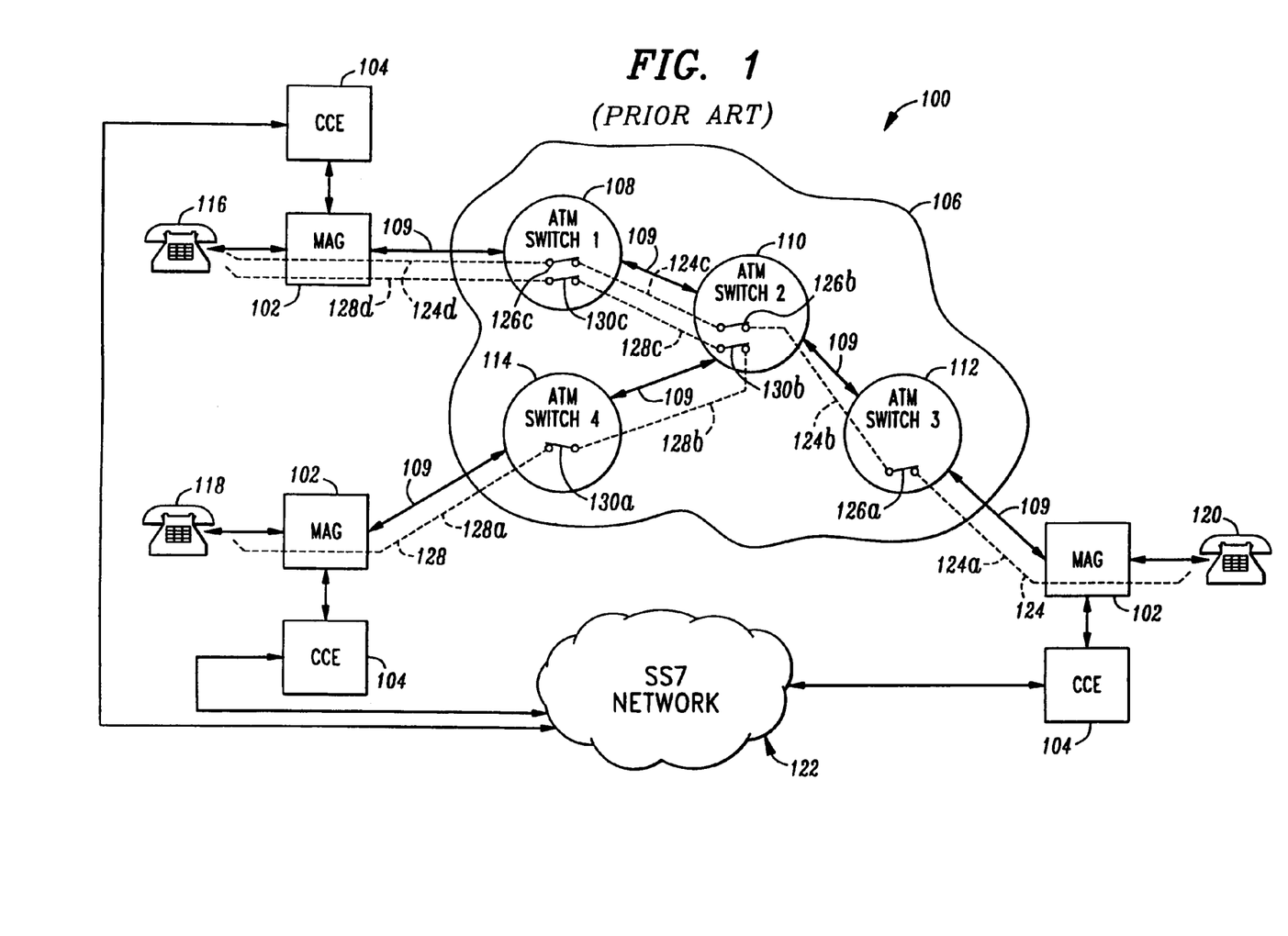
FIG. 1 is a block diagram of a communication system showing ATM call connections.
Figure 2:
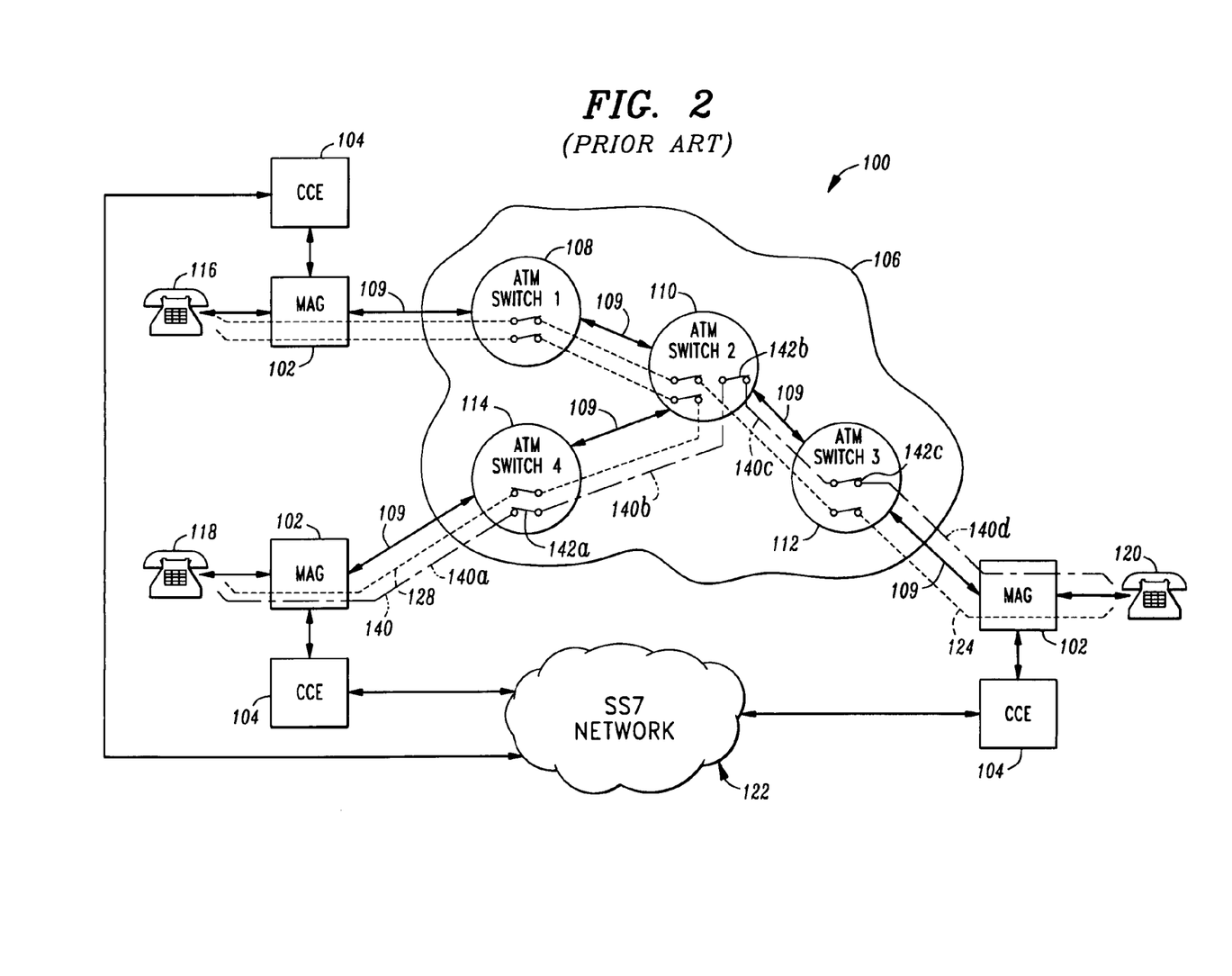
FIG. 2 is a block diagram of a communication system showing a prior art method for transferring the ATM call connections illustrated in FIG. 1.

Several existing voice capabilities require moving a voice connection once it is established. For example, transferring a call or creating a conference call. Currently there is no capability for moving one end of an ATM communication. In order to provide traditional voice connections and features over ATM facilities, a procedure for movement of an ATM connection must be supported. One proposal for transfer or movement of a voice connection over ATM facilities is accomplished by using an inter-telephony switch signaling protocol to convey to the call control entities (telephone switches) that are connected to the voice connections the request for a transfer. The call control entities then instruct the access gateways to establish new ATM connections using ATM bearer signaling in accordance with the transfer. After the new connections are established, all the old connections are released. FIG. 1 and FIG. 2, which are discussed below, illustrate the problem and the proposed solution, respectively.

FIG. 1 is a block diagram of a communication system 100, including media access gateways (MAGs) 102, call control entities (CCEs) 104, and an ATM core 106. Media access gateways 102 are connected to the ATM core 106 via ATM facilities 109. The media access gateways 102 provide communication access for terminals, such as telephones 116,118 and 120. The ATM core 106 includes a plurality of ATM switches that are interconnected via ATM facilities 109. An exemplary arrangement for ATM core 106 shown in FIG. 1 includes ATM switch one 108, ATM switch two 110, ATM switch three 112, and ATM switch four 114. The number and arrangement of ATM switches varies. Call control entities 104 control the actions of the associated media access gateways 102. In addition, the call control entities 104 are coupled to an inter-telephony switch connection network, Signaling System 7 network 122, which provides the transport for bearer independent call control (BICC) signaling.

As shown schematically in FIG. 1, telephone 120 has a call path 124 established with telephone 116. Call path 124 traverses media access gateways 102 coupled to telephones 116 and 120, plural ATM facilities 109 and ATM core 106. More specifically, call path 124 includes a first segment 124a, a second segment 124b, a third segment 124c, and a fourth segment 124d. First segment 124a extends from media access gateway 102 over ATM facility 109 to ATM switch three 112. A switched connection 126a connects first segment 124a to second segment 124b at ATM switch three 112. Second segment 124b extends from ATM switch three 112 over ATM facility 109 to ATM switch two 110. A switched connection 126b connects second segment 124b to third segment 124c at ATM switch two 110. Third segment 124c extends from ATM switch two 110 over ATM facility 109 to ATM switch one 108. A switched connection 126c connects third segment 124c to fourth segment 124d. Fourth segment 124d extends over ATM facility 109 to media access gateway 102.

Another call path 128 traverses media access gateways 102 coupled to telephone 116 and 118, plural ATM facilities 109 and ATM core 106. More specifically, call path 128 includes a first segment 128a, a second segment 128b, a third segment 128c and a fourth segment 128d. First segment 128a extends from media access gateway 102 over ATM facility 109 to ATM switch four 114. A switched connection 130a couples first segment 128a to second segment 128b at ATM switch four 114. Second segment 128b extends from ATM switch four 114 over ATM facility 109 to ATM switch two 110. A switched connection 130b connects second segment 128b to third segment 128c at ATM switch two 110. Third segment 128c extends from ATM switch two 110 over ATM facility 109 to ATM switch one 108. A switched connection 130c couples third segment 128c with fourth segment 128b. Fourth segment 128d extends from ATM switch one 108 to media access gateway 102.

Call paths 124 and 128 are established in any suitable manner. Typically, call paths 124 and 128 are established using standards specified in ATM User-Network Interface (UNI) Signaling Specification, Version 4.0, af-sig-0061.0000 and ATM Forum Private Network-Network Interface (PNNI) Specification, Version 1.0, af-pnni-0055.00. After call paths 124 and 128 are established, a difficulty arises if one of the call paths is to be transferred or moved. For example, if telephone 116 desires to transfer call path 124 to call path 128 such that telephone 120 and telephone 118 are coupled together for voice communications, then a problem arises as to how the desired connections are to be established.

One known proposed solution for transferring call path 124 to call path 128 is illustrated in FIG. 2. In summary, a new connection is established between telephone 120 and telephone 118 and the old connections are released. More specifically, BICC signaling between call control entities 104 results in the call control entities 104 instructing the media access gateways 102 to establish the new ATM connection needed. The media access gateways 102 use UNI signaling to establish the new ATM connection. In particular, a new call path 140 is established to connect telephone 118 to telephone 120. Call path 140 traverses media access gateways 102 that are coupled to telephones 118 and 120, plural ATM facilities 109 and ATM core 106. More specifically, call path 140 includes a first segment 140a that extends from media access gateway 102 over ATM facility 109 to ATM switch four 114. A switched connection 142a couples first segment 140a to second segment 140b. Second segment 140b extends from ATM switch four 114 over ATM facility 109 to ATM switch two 110. A switched connection 142b connects second segment 140b to third segment 140c. Third segment 140c extends from ATM switch two 110 over ATM facility 109 to ATM switch three 112. A switched connection 142c couples third segment 140c to fourth segment 140d. Fourth segment 140d extends from ATM switch three 112 over ATM facility 109 to media access gateway 102. After establishing call path 140, call paths 124 and 128 are released.

One problem with the solution described above and illustrated in FIG. 2 is that the call control entity (switching node) needs to be aware of when another call control entity (switching node) in a call manipulates the call or bearer path. The bearer path, in effect, becomes a shared resource that all switching nodes jointly use to provide their own services. This greatly increases the complexity of implementing services where feature interactions cross switch boundaries. In light of this, a switching node is not able to perform call redirection and insert/remove service circuits in established connections to provide usual features (e.g., N-way bridging, announcement playback, tone generation, tone detection, speech recognition and multicasting) available to traditional time-division multiplexing (TDM) calls. Also, some resources are temporarily duplicated in order to establish the new connection. For example, portions of call path 124 and call path 128 replicate the new call path 140. The complexity required to establish the new connection using BICC signaling and the utilization of additional resources to establish the new connection makes this solution somewhat undesirable.

Therefore, a need exists for an improved transfer capability for ATM virtual channels.

SUMMARY OF THE INVENTION

In accordance with one aspect of the present invention, a method is provided for transferring an ATM call. A first ATM call is established between a first party and a second party and a second ATM call is established between the second party and a third party. The first ATM call includes a plurality of segments that are coupled to a plurality of ATM switches to provide a virtual connection. Similarly, the second ATM call includes a plurality of segments that are coupled to a plurality of ATM switches to provide a virtual connection. To accomplish the transfer, an ATM switch that is coupled to the second party receives a message to transfer the first ATM call to the second ATM call in order to connect the first party and the third party. In response to receiving the message to transfer, the ATM switch connects a first segment of the first ATM call to a first segment of the second ATM call. After successfully connecting a portion of the first ATM call to a portion of the second ATM call, the ATM switch releases a second segment of the first ATM call that extends from the ATM switch to the second party. Similarly, the ATM switch releases a second segment of the second ATM call that extends from the ATM switch to the second party. No separate inter-telephony switch signaling is required. Preferably, a media access gateway is coupled to the ATM switch and the second party. And, a call control entity is coupled to the media access gateway. The media access gateway extends the message to transfer to the ATM switch under control from the media access gateway controller. After transfer is complete, the media access gateway and call control entity may maintain a reference to the call to permit subsequent interaction with the call.

In accordance with another aspect of the invention, an apparatus is provided for transferring an ATM call. The apparatus includes an ATM switch that receives over an ATM facility a message to transfer the first ATM call to a second ATM call. In response to receiving the message, the ATM switch connects a first segment of the first ATM call to a first segment of the second ATM call. The ATM switch then releases a second segment of the first ATM call that extends from the ATM switch to a caller. Also, the ATM switch releases a second segment of the second ATM call that extends from the ATM switch to the caller. The new connection established on the ATM switch transfers the first ATM call to be connected for communication with the second ATM call. Preferably a media access gateway is coupled to the ATM switch and the caller. And, a call control entity is coupled to the media access gateway. The media access gateway extends the message to transfer to the ATM switch under control from the media access gateway controller. After transfer is complete, the media access gateway and call control entity may maintain a reference to the call to permit subsequent interaction with the call.

DESCRIPTION OF THE PREFERRED EMBODIMENTS

Figure 3:
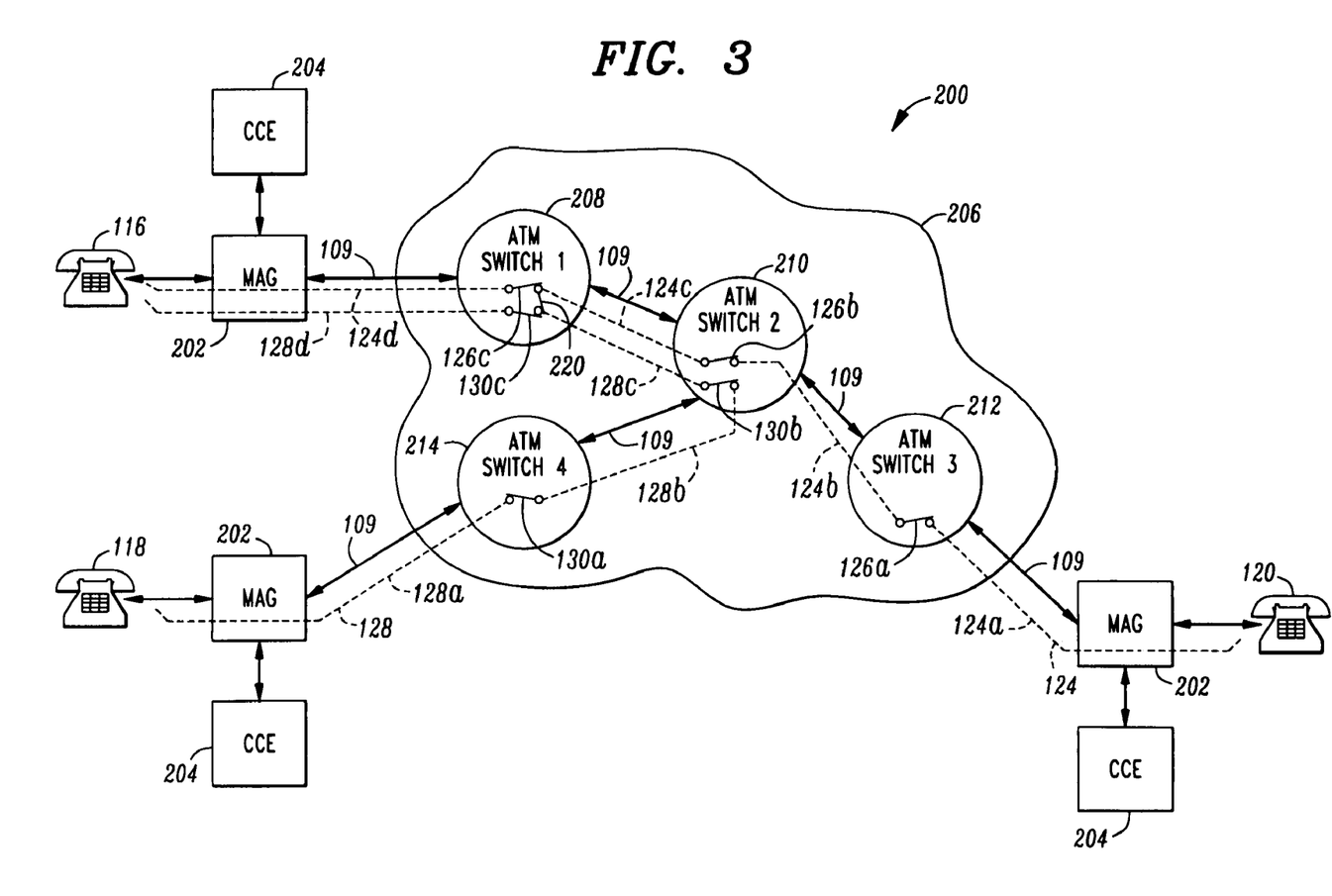
FIG. 3 is a block diagram of a communication system with ATM call connections in accordance with the present invention.

FIG. 3 is a block diagram of a communication system 200 in accordance with the present invention. Communication system 200 includes media access gateways (MAGs) 202, call control entities (CCEs) 204, and an ATM core 206. Media access gateways 202 are connected to the ATM core 206 via ATM facilities 109. The media access gateways 202 provide communication access for terminals, such as telephones 116,118 and 120. The ATM core 206 includes a plurality of ATM switches that are interconnected via ATM facilities 109. In the exemplary arrangement shown in FIG. 3, ATM core 206 includes ATM switch one 208, ATM switch two 210, ATM switch three 212, and ATM switch four 214. The number and arrangement of ATM switches may vary. Call control entities 204 control the actions of the associated media access gateways 202. A telephony switch or switching node may include one or more call control entities 204, media access gateways 202, bridges and the like. Communication system 200 is similar in many respects to communication system 100 of FIG. 1. However, communication system 200 includes media access gateways 202, call control entities 204 and ATM switches in ATM core 206, all of which are preferably modified to accommodate a transfer function in accordance with the present invention, as described below by way of an example.

Media access gateways 202 are preferably trunk access gateways or line access gateways. Call control entities 204 are preferably processor-based apparatus that control one or more media access gateways with modifications to accommodate the present invention. ATM switches in ATM core 206 are preferably any ATM switch modified to accommodate a transfer function in accordance with the present invention. ATM facilities 109 are any transmission medium and protocol for transferring ATM packets.

As shown schematically in FIG. 3, telephone 120 has a call path 124 established with telephone 116. Call path 124 traverses media access gateways 102 coupled to telephones 116 and 120, plural ATM facilities 109 and ATM core 206. More specifically, call path 124 includes a first segment 124*a*, a second segment 124*b*, a third segment 124*c*, and a fourth segment 124d. First segment 124a extends from media access gateway 202 over ATM facility 109 to ATM switch three 112. A switched connection 126a connects first segment 124a to second segment 124b at ATM switch three 212. Second segment 124b extends from ATM switch three 212 over ATM facility 109 to ATM switch two 210. A switched connection 126b connects second segment 124b to third segment 124c at ATM switch two 210. Third segment 124c extends from ATM switch two 210 over ATM facility 109 to ATM switch one 208. A switched connection 126c connects third segment 124c to fourth segment 124d. Fourth segment 124d extends over ATM facility 109 to media access gateway 202.

Another call path 128 traverses the media access gateways 202 coupled to telephone 116 and 118, plural ATM facilities 109 and ATM core 206. More specifically, call path 128 includes a first segment 128a, a second segment 128b, a third segment 128c and a fourth segment 128d. First segment 128a extends from media access gateway 202 over ATM facility 109 to ATM switch four 214. A switched connection 130a couples first segment 128a to second segment 128b at ATM switch four 114. Second segment 128b extends from ATM switch four 214 over ATM facility 109 to ATM switch two 210. A switched connection 130b connects second segment 128b to third segment 128c at ATM switch two 210. Third segment 128c extends from ATM switch two 210 over ATM facility 109 to ATM switch one 208. A switched connection 130c couples third segment 128c with fourth segment 128d. Fourth segment 128d extends from ATM switch one 208 to media access gateway 102.

Call paths 124 and 128 are established in any suitable manner.

Preferably, call paths 124 and 128 are established using UNI and PNNI signaling for establishment of ATM bearer connections. After call paths 124 and 128 are established, a transfer of call path 124 to call path 128 is accomplished in accordance with the present invention. More specifically, under control of, and at the request of telephone 116, telephone 118 and telephone 120 are coupled together for communication.

Preferably, a user at telephone 116 request that telephone 120 and 15 telephone 118 be interconnected. That is, telephone 116 request that call path 124 be interconnected to call path 128. The request may take any suitable form, for example, a flash hook signal from a touch-tone terminal or telephone.

The request is received by media access gateway 202, which preferably sends the request to call control entity 204 for interpretation. Call control entity 204 receives the request and determines that it is a transfer request. In response to the request, the call control entity 204 directs the media access gateway 202 to send a transfer request to the ATM switch one 208 directly coupled to the media access gateway 202. The transfer request preferably takes the form of a message that is sent over the ATM facility 109. Most preferably, the transfer message includes identifiers, such as call references, for both call path 124 and call path 128.

ATM switch one 208 receives the transfer message with the call identifiers over ATM facility 109. In response to the transfer message, ATM switch one 208 connects a first portion of call path 124 to a first portion of call path 128. This connection is shown as switched connection 220. The first portion of call path 124 that is connected to switch connection 220, includes third segment 124c, switched connection 126b, second segment 124b, switched connection 126a and first segment 124a. The first portion of call path 128 that is connected to switched connection 220 includes third segment 128c, switched connection 130b, second segment 128b, switched connection 130a, and first segment 128a.

The new switched connection 220 made at ATM switch one 208 sends data received on third segment 124c to third segment 128c. And, switched connection 220 sends data received on third segment 128c to third segment 124c. This generally entails changing the routing of ATM cells and the mapping of ATM headers to establish the desired connections.

After the new connection 220 is established, the portions of the call paths that are no longer necessary are released. In particular, switched connection 126c and fourth segment 124d, which coupled media access gateway 202 to ATM switch one 208 for call path 124, are released. Also, switched connection 130c and fourth segment 128d, which coupled media access gateway 202 to ATM switch one 208 for call path 128, are released. Release completion messages are preferably sent to the media access gateway 202 after successful completion of the transfer.

Figure 4:
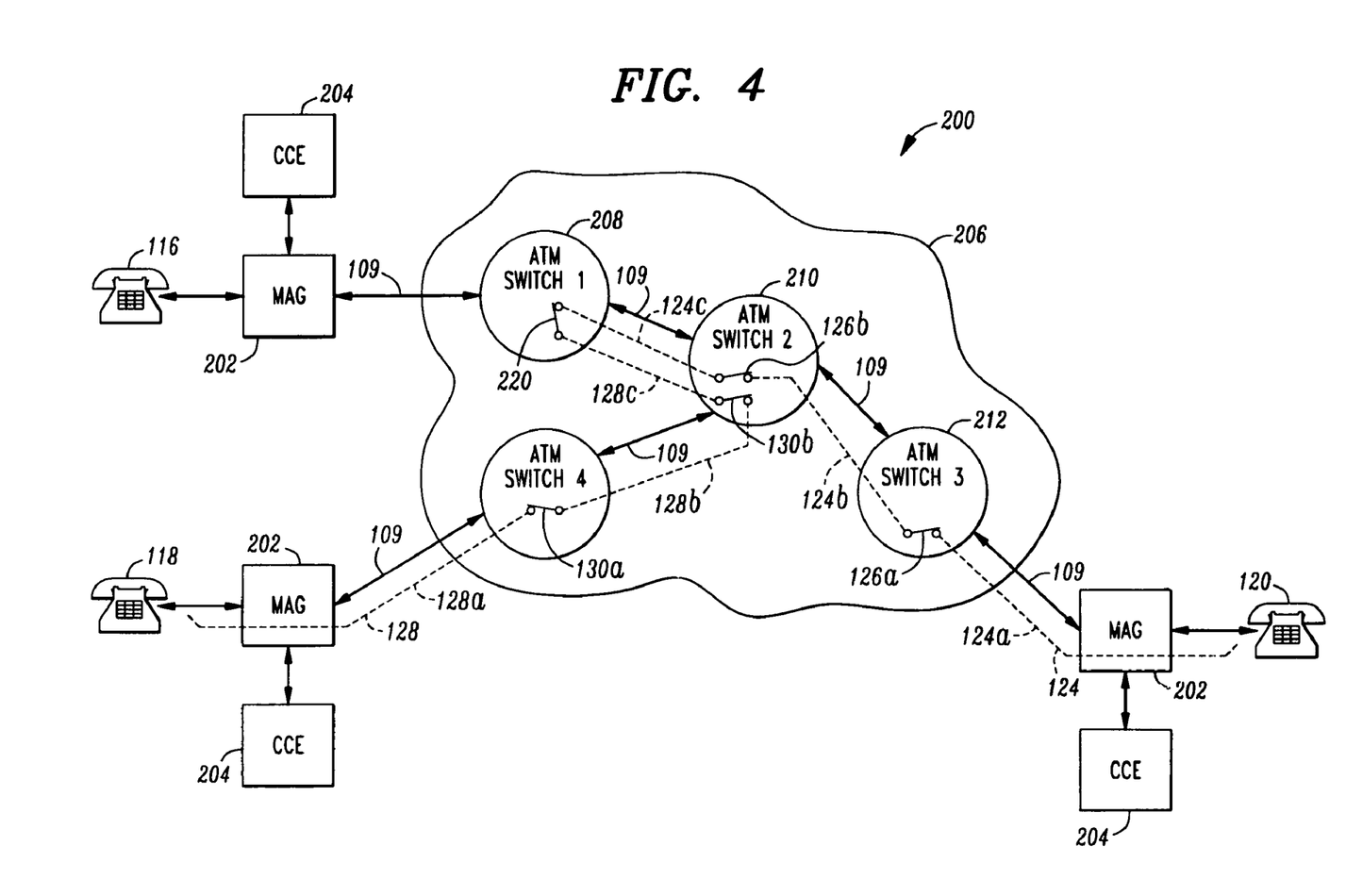
FIG. 4 is a block diagram of a communication system with ATM call connections in accordance with the present invention.

FIG. 4 shows communication system 200, including the transferred call path that results from the new connection and released connections described above. Notably, the existing call paths are reused in the transferred call path to the extent necessary. This conserves valuable resources. Also, no communication with switches other than ATM switch one 208 is necessary, which conserves resources and reduces the time required to cause the transfer. Also, the complexity of inter-telephony switch communication is avoided.

Figure 5:
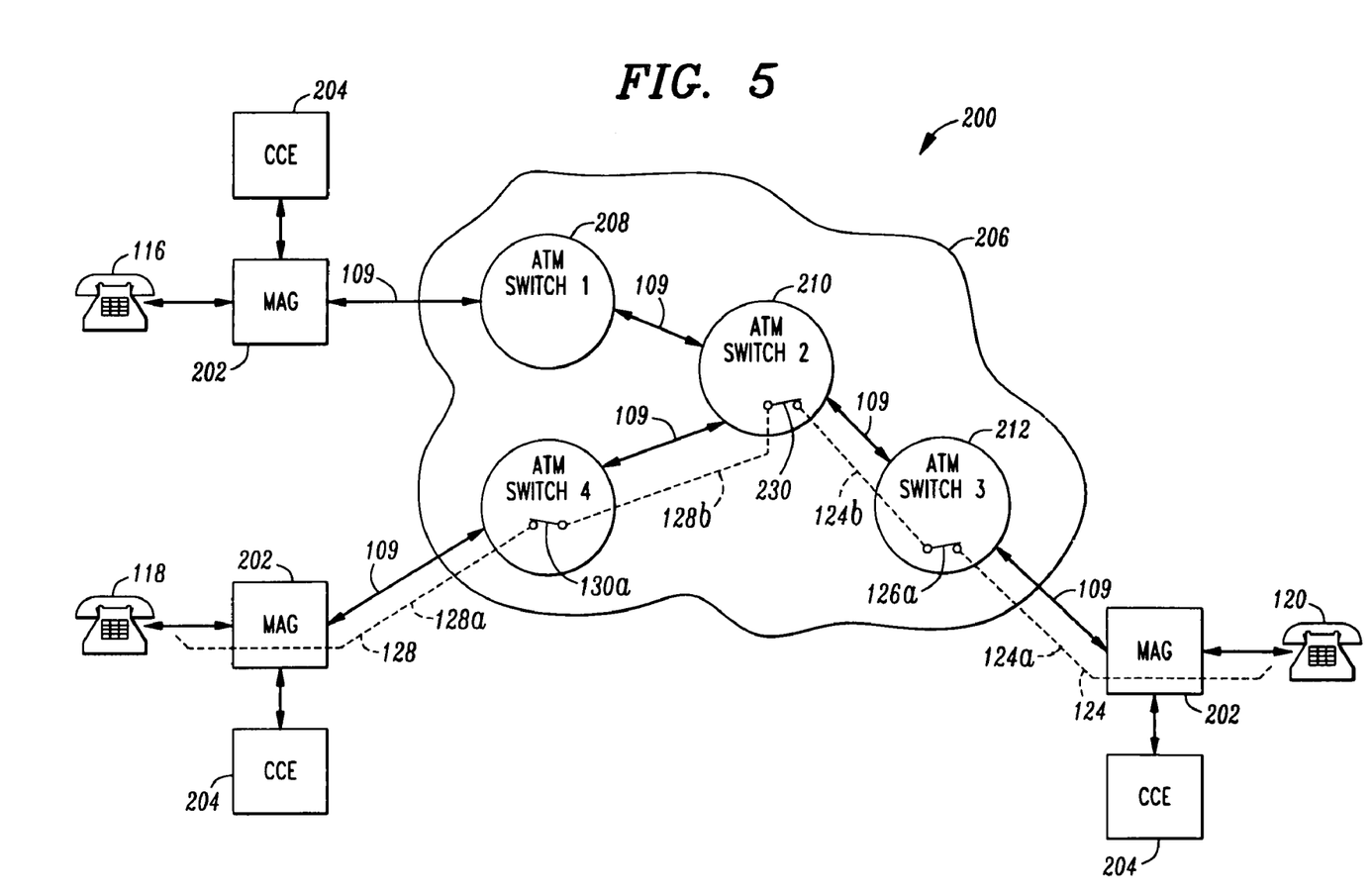
FIG. 5 is a block diagram of a communication system with ATM call connections in accordance with the present invention.

In an alternate embodiment, transfer messages are also sent between ATM switches to minimize the switching resources required to effect a transfer. That is, if a switch receives a transfer message and it determines that the call paths that are to be joined originate from the same ATM switch, then the transfer message, including the appropriate call identifiers is sent to the ATM switch that supplies both calls. For example, ATM switch one 208, upon receiving the transfer message from media access gateway 202 determines that call path 124 and call path 128 both originate from ATM switch two 210. Therefore, ATM switch one 208, optionally sends a transfer message to ATM switch two 210. In response to receiving the transfer message, ATM switch two 210 connects the required portions of call path 124 to the required portions of call path 128. This connection 230 is illustrated in FIG. 5 and is accomplished in a manner analogous to the connection 220. The portions of the call paths no longer necessary are released after connection 230 is established. In particular, as shown in FIG. 5, switched connection 126b, third segment 124c, switched connection 126c and fourth segment 124d of call path 124 are released. And, switched connection 130b, third segment 128c, switched connection 130c and fourth segment 128d of call path 128 are released. After successful completion of the connection and releases, release complete messages are sent from ATM switch two 210 to ATM switch one 208, and subsequently from ATM switch one 208 to media access gateway 202. The alternate arrangement discussed above and shown in FIG. 5 advantageously reduces resources required for the transfer, but adds some complexity in tracking the calls, effecting the transfer and other areas, such as billing.

A variation on the transfers discussed above with respect to FIGS. 3–5 is preferred for some calls. In particular after resources are released and the transfer of the call path is complete, rather than remove all references to the call from the media access gateway that no longer has a call path to the transferred call, the media access gateway maintains references to the transferred call and maintains some control over the call. In the embodiments and examples discussed above, media access gateway 102 connected to telephone 116 preferably maintains control over the transferred call between telephone 120 and telephone 118. By maintaining control, the media access gateway is able to subsequently modify or interact with the call or bearer path without the set up of a new call or connection. For example, the media access gateway may connect to the transferred path to play an announcement or set up a bridge. Where the media access gateway maintains control after a transfer, the call control entity coupled to the media access gateway preferably perceives the call as though it is joined through that media access gateway.

As described above, a new transfer capability is added to ATM communications. The transfer reduces the inter-telephony switch and inter-ATM switch signaling required to effect a transfer of ATM calls. ATM resources are used efficiently in effecting the transfers. The basic transfer capability is utilized with any ATM communications, including communications with bridges and other conference circuits. The transfer capability is readily integrated into higher level functions, such as establishment of conference calls, where a transfer is required to establish the conference call.

Whereas the present invention has been described with respect to specific embodiments thereof, it will be understood that various changes and modifications will be suggested to one skilled in the art and it is intended that the invention encompass such changes and modifications as fall within the scope of the appended claim.

What is claimed is:

1. A method for transferring an asynchronous transfer mode call, wherein a first asynchronous transfer mode call is established between a first party and a second party and a second asynchronous transfer mode call is established between the second party and a third party, wherein the first asynchronous transfer mode call includes a plurality of segments that are coupled to a plurality of asynchronous transfer mode switches to provide a virtual connection, and wherein the second asynchronous transfer mode call includes a plurality of segments that are coupled to a plurality of asynchronous transfer mode switches to provide a virtual connection, the method comprising the steps of:

an asynchronous transfer mode switch coupled to the second party receiving a message to transfer the first asynchronous transfer mode call to the second asynchronous transfer mode call to connect the first party and the third party;

the asynchronous transfer mode switch connecting a first segment of the first asynchronous transfer mode call to a first segment of the second asynchronous transfer mode call;

the asynchronous transfer mode switch releasing a second segment of the first asynchronous transfer mode call that extends from the asynchronous transfer mode switch to the second party;

the asynchronous transfer mode switch releasing a second segment of the second asynchronous transfer mode call that extends from the asynchronous transfer mode switch to the second party;

wherein the second party is coupled to the asynchronous transfer mode switch by a media access gateway and the media access gateway sends the message to the asynchronous transfer mode switch;

wherein the media access gateway is coupled to a call control entity that receives a request from the second party to transfer the first asynchronous transfer mode call to the second asynchronous transfer mode call and wherein the media access gateway generates the message under control of the call control entity in response to the request from the second party; and wherein the media access gateway maintains control over a connection between the first segment of the first asynchronous transfer mode call and the first segment of the second asynchronous transfer mode call after the second segment of the first asynchronous transfer mode call and the second segment of the second asynchronous transfer mode call are released.

2. The method of claim 1 wherein the message includes a first identifier for the first asynchronous transfer mode call and a second identifier for the second asynchronous transfer mode call.

3. The method of claim 2 wherein the first identifier is a call reference for the first asynchronous transfer mode call and the second identifier is a call reference for the second asynchronous transfer mode call.

4. The method of claim 1 wherein the media access gateway is a trunk access gateway or a line access gateway.

5. The method of claim 1 wherein the message is received by the asynchronous transfer mode switch via the second segment of the first asynchronous transfer mode call or via the second segment of the second asynchronous transfer mode call.

6. An apparatus for transferring an asynchronous transfer mode call, comprising:

an asynchronous transfer mode switch that receives a message to transfer a first asynchronous transfer mode call to a second asynchronous transfer mode call;

a media access gateway that is coupled to a caller and coupled to the asynchronous transfer mode switch by an asynchronous transfer mode facility, wherein the media access gateway transmits the message to the asynchronous transfer mode switch;

a call control entity coupled to the media access gateway that:

receives a request from the caller to transfer the first asynchronous transfer mode call to the second asynchronous transfer mode call; and directs the media access gateway to transmit the message to the asynchronous transfer mode switch:

wherein the message is received over the asynchronous transfer mode facility that couples the first asynchronous transfer mode call or the second asynchronous transfer mode call to the asynchronous transfer mode switch;

wherein in response to the message, the asynchronous transfer mode switch connects a first segment of the first asynchronous transfer mode call to a first segment of the second asynchronous transfer mode call; and wherein the asynchronous transfer mode switch releases a second segment of the first asynchronous transfer mode call that extends from the asynchronous transfer mode switch to the caller and releases a second segment of the second asynchronous transfer mode call that extends from the asynchronous transfer mode switch to the caller; and wherein the media access gateway maintains control over a connection between the first segment of the first asynchronous transfer mode call and the first segment of the second asynchronous transfer mode call after the second segment of the first asynchronous transfer mode call and the second segment of the second asynchronous transfer mode call are released.

7. The apparatus of claim 6 wherein the message includes a first identifier for the first asynchronous transfer mode call and a second identifier for the second asynchronous transfer mode call.

8. The apparatus of claim 7 wherein the first identifier is a call reference for the first asynchronous transfer mode call and the second identifier is a call reference for the second asynchronous transfer mode call.

* * * * *